Oct. 2, 1962         R. W. MILLS         3,056,631
WHEEL BALANCE WEIGHT AND CLIP
Filed Oct. 16, 1961

INVENTOR.
RALPH W. MILLS
BY
Harold B. Hood
Attorney

United States Patent Office 3,056,631
Patented Oct. 2, 1962

3,056,631
WHEEL BALANCE WEIGHT AND CLIP
Ralph W. Mills, P.O. Box 605, Kokomo, Ind.
Filed Oct. 16, 1961, Ser. No. 145,134
2 Claims. (Cl. 301—5)

For balancing automobile wheels, it has long been conventional to use a lead weight cast upon one end of a spring steel clip which is formed at its opposite end with hook means adapted resiliently to grip the lip of the wheel rim, the tip of the hook extending radially inwardly far enough to be frictionally gripped between the lip of the wheel rim and the tire mounted on said rim. This type of weight-and-clip assembly has served quite satisfactorily upon most forms of wheel rims conventionally used in the automotive industry for more than twenty-five years.

Currently, a different form of wheel rim has begun to attain favor, particularly for the wheels of light trucks. In such rims, an annular cavity is concentrically disposed radially inwardly of the lip, and one wall of that cavity inclines smoothly both radially and axially outwardly to merge with the rim lip which is formed of approximately circular cross section and upon a relatively large diameter. Because of the inclined surface of that cavity wall, a relatively powerful, axially outward component of force is imparted to a weight of the above-described conventional assembly by centrifugal action when a wheel of this character, equipped with such a conventional weight assembly, is driven at relatively high speeds; and it has been found that, as a result of this action, coupled with the above-described shape of the rim lip, such conventional weight assemblies do not adhere satisfactorily to the wheel. Instead, the clips of such conventional assemblies are frequently flexed and are sometimes thrown from the wheel rim during vehicle travel at relatively high speeds.

Additionally, the clips of currently-available conventional weights extend deeply radially-inwardly of the rim between the rim lip and the tire in order to overcome the possibility of such disengagement. This necessitates deflation of the tire in order to install, remove or adjust a weight; and, since balance cannot be effectively tested except when the tire is fully inflated, the task of properly locating a balancing weight on such a wheel becomes quite burdensome.

The present invention relates to a novel weight and clip assembly, particularly designed for installation upon wheel rims of the character above described, and peculiarly designed and constructed to overcome the deficiencies of conventional weighted clip assemblies.

A primary object of the invention is to provide a weight and clip assembly of such character as to adhere to rims of the type described at maximum highway speeds. A further object of the invention is to provide, in such an assembly, means effective positively to prevent clip flexure under the influence of centrifugal force, in spite of the camming effect of the above described cavity wall shape.

A further object of the invention is to provide a weight and clip assembly having the above characteristics but in which the weight and the clip are formed as separate pieces to facilitate the assembly thereof upon a wheel rim, and the movement thereof peripherally of the wheel rim, in seeking the exact, optimum location for the assembly relative to the wheel rim.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
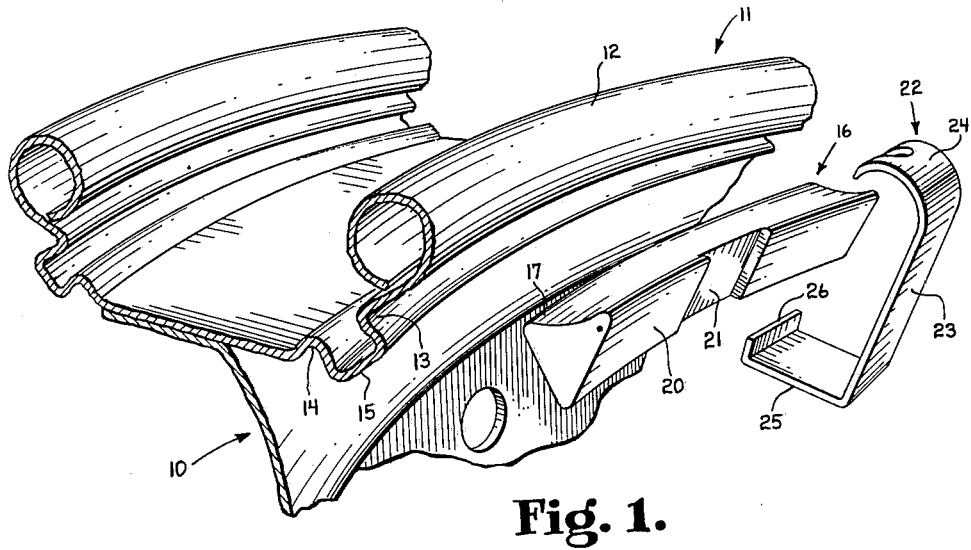
FIG. 1 is a perspective view of a fragment of a wheel of the character above described and showing a weight and a clip, constructed in accordance with the present invention, in disassembled relation to the wheel rim.

Referring more particularly to the drawings, it will be seen that I have illustrated a fragment of a wheel of the character above described, indicated generally by the reference numeral 10, said wheel including a rim indicated generally by the reference numeral 11. One particular embodiment of a wheel of the character described is known as the Kelsey-Hayes wheel, and, as illustrated, the rim 11 of such a wheel comprises a rolled lip 12 of substantially circular cross section, an outer, annular cavity 13 concentrically disposed radially and axially inwardly of the lip and an inner annular cavity 14 concentrically disposed radially and axially inwardly of the cavity 13, the cavities 13 and 14 being separated by a concentric, annular land 15.

According to the present invention, a cast weight of lead or other suitable material, indicated generally by the reference numeral 16, is formed to provide a generally V-shaped rear surface 17 designed for substantially conforming reception in the cavity 13 and having wing surfaces 18 and 19 joined by a substantially flat front surface 20 intermediately formed with a transverse groove 21.

For use with such a weight, I provide a clip indicated generally by the reference numeral 22. The clip 22 is formed of spring strip material, such as spring steel and comprises a substantially flat body 23 formed at one end to provide a hook 24 shaped to conform to the external surface of the rim lip 12 and projecting in one direction from the plane of the body 23. At its opposite end, the clip 22 is formed with a tail 25 which is angularly related to the body at approximately 100° and which terminates in a toe 26. The tail 25 projects from the plane of the body 23 in the same direction as the hook 24, and the toe 26 is turned generally toward said hook.

Figure 2:
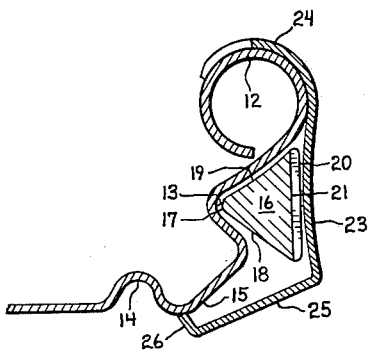
FIG. 2 is a central transverse section through the weight and clip of the present invention in an intermediate condition of assembly on the wheel rim.

The clip 22 is so proportioned and designed relative to the rim 11 that, when the hook 24 is engaged over the lip 12 and the opposite end of the clip is moved axially inwardly relative to the wheel, the toe 26 will engage the land 15 near its radially inner edge and, as such inward movement of the clip end is continued, as by tapping the lower end of the body 23 lightly with a hammer, the extremity of the toe cams inwardly along the surface of the land 15, thus slightly flexing the clip and attaining a frictionally-retaining engagement with said land 15. At this point, the body 23 of the clip is so spaced from the base of the cavity 13 as to permit the weight 16, when seated in said cavity, to be moved peripherally of the wheel rim and between the rim and the clip body in the manner suggested in FIG. 2. The width of the clip body 23 substantially conforms to the width of the groove 21. When the groove 21 has been brought into registry with the clip body 23, the lower end of said clip body may be smartly rapped with a hammer to drive the toe 26 into the cavity 14, whereby the clip body 23 is moved solidly into the groove 21 of the weight 16 to hold said weight against peripheral movement relative to the clip 22. The parts are so proportioned and designed, as is clearly illustrated in FIG. 3, that when they occupy this relationship, the clip body 23 is somewhat flexed and its mid-portion solidly engages the floor of the groove 21 to hold the weight 16 solidly seated within the cavity 13.

Now, it will be perceived that any tendency of the weight 16 to be cammed axially outwardly along the upper wall of the cavity 13 as a result of centrifugal force will be positively resisted by the engagement of the toe 26 within the cavity 14. Thus, the weight is firmly and positively held in place even when the wheel is travelling at highway speeds.

Figure 3:
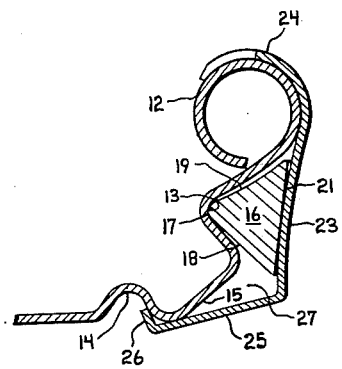
FIG. 3 is a similar section showing the parts in fully assembled relation.

Inspection of FIG. 3 clearly shows that, when the assembly is finally seated on the wheel, a space is provided as at 27 between the land 15 and a portion of the tail 25. A screw driver or other prying tool may readily be inserted into the space 27 to exert a radially inward force upon the tail 25 to withdraw the toe 26 from the cavity 14, thus releasing the clip from the wheel rim. Thereby, if it is desired to move the clip and weight assembly peripherally of the wheel after original assembly and testing, such adjustment can be readily accomplished.

The present construction permits the mounting of a weight at any desired point on the periphery of a wheel rim, facilitates exact location of the weight on the rim and yet provides a firm and solid mounting for the weight, from which the weight cannot escape under any normal conditions of operation.

I claim as my invention:

1. For use with a wheel having a rim formed to provide an annular lip, an outer annular cavity concentrically spaced radially inwardly from said lip, an inner annular cavity concentrically spaced radially inwardly from said outer annular cavity and an annular land concentrically intervening between said cavities; the invention which comprises a clip formed of spring strip material, said clip being formed to provide a hook at one end, a tail terminating in an angularly disposed toe at the opposite end, and a body integrally joining said hook and said tail, said hook being proportioned and designed to engage retainingly over said wheel rim lip while said toe alternatively engages retainingly in said inner cavity or bears on said land with said body spanning said outer cavity, and a weight having a rear surface proportioned and designed for substantially conforming reception in a segment of said outer cavity and having a forward surface formed with a transverse groove extending substantially radially of said wheel when said weight is so received, said weight and clip being so proportioned and designed that, when said hook so engages said lip and said toe so bears on said land while said weight rear surface is so received, said weight may be freely moved peripherally between said wheel and said clip body, but when said clip toe is so engaged in said inner cavity while said weight groove registers with said clip body, said body will be seated within said groove to retain said weight against peripheral movement within said outer cavity.

2. Wheel balancing means comprising a weight formed to provide a generally V-shaped rear surface and a substantially flat front surface formed with a transverse groove thereacross, and a clip of spring strip material wholly separate from said weight and formed to provide a substantially flat body whose width substantially conforms to the width of said groove and whose length exceeds the length of said groove, said clip being formed to provide a substantially semicircular hook at one end projecting away from the plane of said body, and being formed at its opposite end with a tail projecting in the same direction from said plane and terminating in a toe turned generally toward said hook and disposed beyond that side of said weight remote from said hook.

References Cited in the file of this patent

UNITED STATES PATENTS 2,065,633　　Van Halteren _____ Dec. 29, 1936

FOREIGN PATENTS 584,769　　France _____ Nov. 27, 1924
798,681　　France _____ Mar. 10, 1936

OTHER REFERENCES

German printed application 1,087,030, Aug. 11, 1960.